United States Patent
Vapnik et al.

(10) Patent No.: US 8,065,241 B2
(45) Date of Patent: Nov. 22, 2011

(54) LEARNING MACHINE THAT CONSIDERS GLOBAL STRUCTURE OF DATA

(75) Inventors: Vladimir N. Vapnik, Plainsboro, NJ (US); Michael R. Miller, Lumberton, NJ (US); Margaret A. Miller, legal representative, Lumberton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 879 days.

(21) Appl. No.: 12/100,220

(22) Filed: Apr. 9, 2008

(65) Prior Publication Data

US 2008/0313112 A1 Dec. 18, 2008

Related U.S. Application Data

(63) Continuation-in-part of application No. 11/252,487, filed on Oct. 18, 2005, now abandoned.

(51) Int. Cl.
*G06F 15/18* (2006.01)
*G06N 3/00* (2006.01)
(52) U.S. Cl. .......................... 706/12; 382/159; 704/243
(58) Field of Classification Search .................. 706/20, 706/12
See application file for complete search history.

(56) References Cited

U.S. PATENT DOCUMENTS 6,327,581 B1 * 12/2001 Platt .............................. 706/12
2005/0228591 A1 * 10/2005 Hur et al. ...................... 702/19
* cited by examiner

*Primary Examiner* — Omar Fernandez Rivas
*Assistant Examiner* — Kalpana Bharadwaj
(74) *Attorney, Agent, or Firm* — Joseph Kolodka

(57) ABSTRACT

A new machine learning technique is herein disclosed which generalizes the support vector machine framework. A separating hyperplane in a separating space is optimized in accordance with generalized constraints which dependent upon the clustering of the input vectors in the dataset.

9 Claims, 4 Drawing Sheets

LEARNING MACHINE THAT CONSIDERS GLOBAL STRUCTURE OF DATA

RELATED APPLICATIONS

This application is a continuation-in-part of application Ser. No. 11/252,487, filed Oct. 18, 2005. The entire disclosure of application Ser. No. 11/252,487 is incorporated herein by reference.

FIELD OF THE INVENTION

The invention relates to learning machines and, more particularly, to kernel-based techniques for implementing learning machines.

BACKGROUND OF THE INVENTION

There are a number of known techniques for automating the classification of data based on an analysis of a set of training data. Of particular interest herein are kernel-based techniques such as support vector machines. The development of support vector machines has a history that dates back to 1965, when Chervonenkis and Vapnik developed an algorithm referred to as the generalized portrait method for constructing an optimal separating hyperplane. A learning machine using the generalized portrait method optimizes the margin between the training data and a decision boundary by solving a quadratic optimization problem whose solution can be obtained by maximizing the functional:

$$W(\alpha) = \sum_{i=1}^{l} \alpha_i - \frac{1}{2} \sum_{i,j=1}^{l} \alpha_i \alpha_j y_i y_j (x_i, x_j)$$

subject to the constraint that $\Sigma_{i=1}^{l} y_i \alpha_i = 0$ and $\alpha_i \geq 0$. The Lagrange multipliers $\alpha_i$ define the separating hyperplane used by the learning machine. Supposing the optimal values for the multipliers are $\alpha_i^o$ and the corresponding value for the threshold is $b_o$, the equation for this hyperplane is $\Sigma_{i=1}^{l} \alpha_i^o y_i (x_i, x) + b_o = 0$.

In 1992, Boser, Guyon, and Vapnik devised an effective means of constructing the separating hyperplane in a Hilbert space which avoids having to explicitly map the input vectors into the Hilbert space. See Bernard E. Boser, Isabelle M. Goyon, and Vladimir N. Vapnik, "A Training Algorithm for Optimal Margin Classifiers," Proceedings of the Fifth Annual Workshop on Computational Learning Theory (July 1992), Instead, the separating hyperplane is represented in terms of kernel functions which define an inner product in the Hilbert space. The quadratic optimization problem can then be solved by maximizing the functional:

$$W(\alpha) = \sum_{i=1}^{l} \alpha_i - \frac{1}{2} \sum_{i,j=1}^{l} \alpha_i \alpha_j y_i y_j K(x_i, x_j)$$

subject to the constraints $$\sum_{i=1}^{l} y_i \alpha_i = 0$$

and $\alpha_i \geq 0$.

In this case, the corresponding equation of the separating hyperplane is $$\sum_{i=1}^{l} \alpha_i^o y_i K(x_i, x) + b_o = 0 \quad (1)$$

In 1995, Cortes and Vapnik generalized the maximal margin idea for constructing the separating hyperplane in the image space when the training data is non-separable. See Corinna Cortes and Vladimir N. Vapnik, "Support Vector Networks," Machine Learning, Vol. 20, pp. 273-97 (September 1995). The quadratic form of the optimization problem is expressed in terms of what is referred to as a "slack variable" which is non-zero for those points that lie on the wrong side of the margin, thereby allowing for an imperfect separation of the training data. By converting to the dual form, the quadratic optimization problem can again be expressed in terms of maximizing the following objective functional $$W(\alpha) = \sum_{i=1}^{l} \alpha_i - \frac{1}{2} \sum_{i,j=1}^{l} \alpha_i \alpha_j y_i y_j K(x_i, x_j)$$

subject to the constraint $\Sigma_{i=1}^{l} y_i \alpha_i = 0$ but with the new constraint that $$0 \leq \alpha_i \leq C.$$

Again, the corresponding equation of the separating hyperplane is given by equation (1) above. The equation is an expansion of those vectors for which $\alpha_i \neq 0$, these vectors being referred to in the art as "support vectors." To construct a support vector machine one can use any positive definite function K $(x_i, x_j)$ creating different types of support vector machines. Support vector machines have proven to be useful for a wide range of applications, including problems in the areas of bioinformatics or text classification.

SUMMARY OF INVENTION

A method for training a support vector machine includes receiving input vectors from a labeled dataset that have been clustered into one or more clusters, the input vectors from the labeled dataset relating to a phenomenon of interest; creating simultaneously a t+1 space of a decision function and a t space of a correcting function where t is the number of clusters; specifying generalized constraints in the space of the correcting function which are dependent upon the clusters of input vectors in the dataset; generating in the space of the correcting function, a subset of the input vectors from the dataset using the decision function subject to the generalized constraints, the subset of the input vectors defining a separating hyperplane in a space of the decision function, the subset of the input vectors for use by the support vector machine in describing input vectors from an unlabeled dataset relating to the phenomenon of interest; and wherein the generalized constraints can be represented as $$\sum_{i \in T_r} \alpha_i K_r(x_i, x_j) \leq C \sum_{i \in T_r} K_r(x_i, x_j), j \in T_r, r = 1, \ldots, t$$

-continued $$\sum_{i \in T_r} \alpha_i \leq |T_r|C, r = 1, \dots, t,$$

$$\sum_{i=1}^{l} y_i \alpha_i = 0, \alpha_i \geq 0$$

where there are t clusters and where $K_r$ is the kernel function defined on the correct space into which the input vectors within the cluster r are mapped, $\alpha_i$ are the coefficients determining the separating hyperplane in the separating space, and $T_r$ defines a set of indices of input vectors within a cluster r.

These and other advantages of the invention will be apparent to those of ordinary skill in the art by reference to the following detailed description and the accompanying drawings.

DETAILED DESCRIPTION

Figure 1:
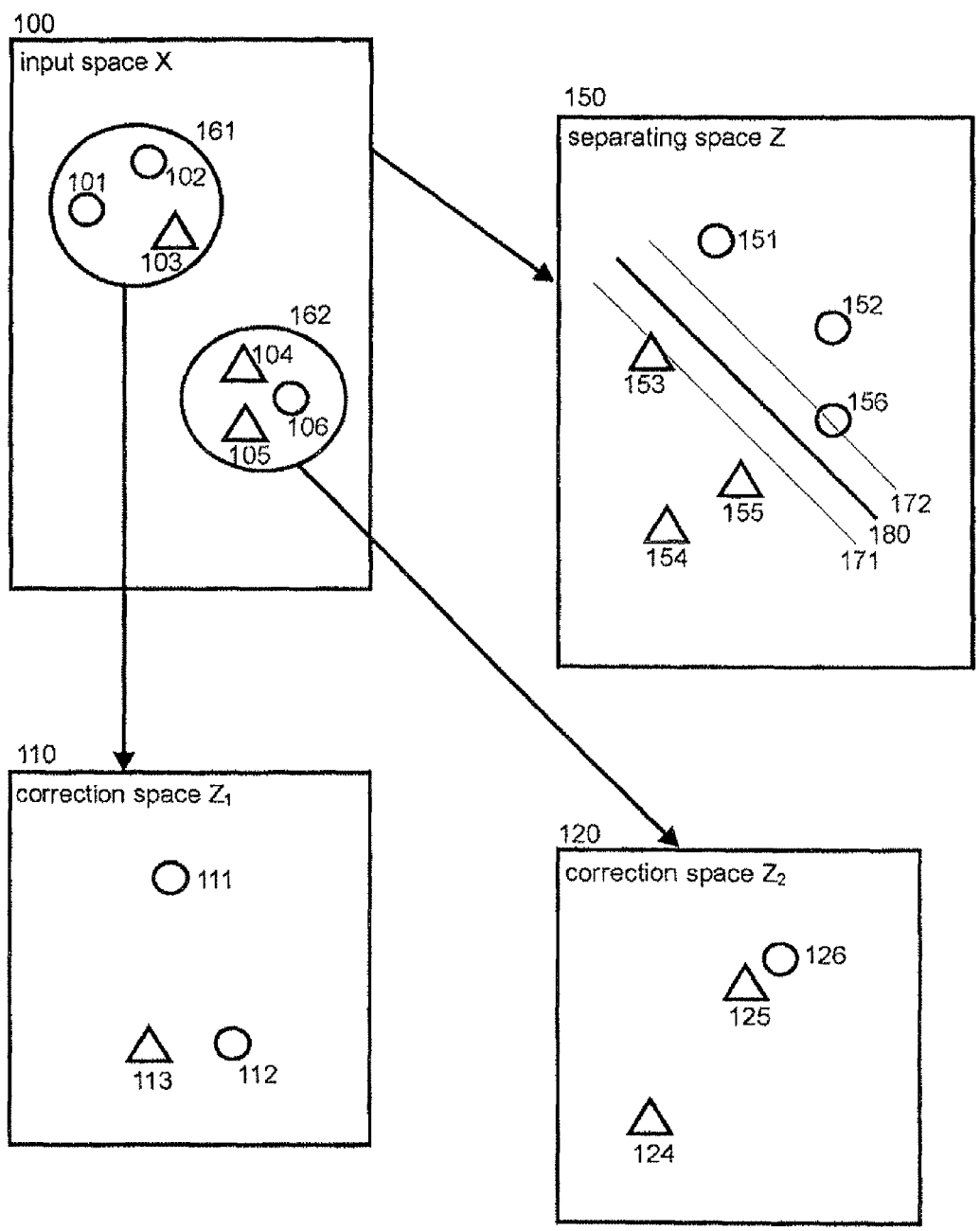
FIG. 1 is an abstract diagram illustrating the principles underlying the disclosed machine learning technique.

FIG. 1 is an abstract diagram illustrating the principles underlying the disclosed machine learning technique.

The training data for the learning machine are represented as input vectors in an input space, e.g., illustratively depicted in FIG. 1 as 101, 102, . . . 106 in the input space 100. Each training input vector 101, 102, . . . 106 is labeled with a classification label, illustratively depicted in FIG. 1 as a dot for a first label and as a triangle for a second label. The classification label can represent, for example and without limitation, whether the training data corresponding to the input vector is a member or a non-member of a specified class. The goal is to construct a separating function based on the training input vectors 101, 102, . . . 106 which can act as a classifier on the data.

These training input vectors 101, 102, . . . 106, are initially clustered either manually or using any of a number of known automated clustering techniques. FIG. 1 depicts two example clusters 161, 162, formed on the training vectors—cluster 161 being formed from input vectors 101, 102, 103, and cluster 162 being formed from input vectors 104, 105, 106. It should be noted that although two clusters are depicted in FIG. 1, any number of clusters, including a single cluster on all of the training input vectors, can be formed in accordance with the disclosed technique. In contrast with prior art techniques, each input vector is simultaneously mapped into two spaces: a separating space 150 which defines the separating function and into a correction space 110, 120 which defines what the inventors refer to as a correction function. Note that although each of the input vectors 101, 102, . . . 106 are mapped into the same separating space 150, each cluster 161, 162 of input vectors can be assigned a different correction function and, accordingly, a different correction space 110, 120. As depicted in FIG. 1, the input vectors in cluster 161 are mapped to correction space 110 while the input vectors in cluster 162 are mapped to correction space 120.

As further explained herein, a separating hyperplane 180 is constructed in the separating space 150 which defines the above-mentioned separating function. The separating hyperplane 180 is constructed in a manner which not only optimizes the margins 171, 172 in the separating space 150, but which also takes into account the correction functions of the corresponding clustered input vectors. Accordingly, in contrast with prior art techniques, the separating function can be generated in a manner which takes advantage of any a priori knowledge one may have about the global structure of the training data, including the noise characteristics in the input space 100. As further discussed herein, the disclosed technique can be seen as a generalization of the support vector machine framework; accordingly, the inventors refer to the technique as "SVM+".

A preferred embodiment is further described with reference to FIG. 2.

Figure 2:
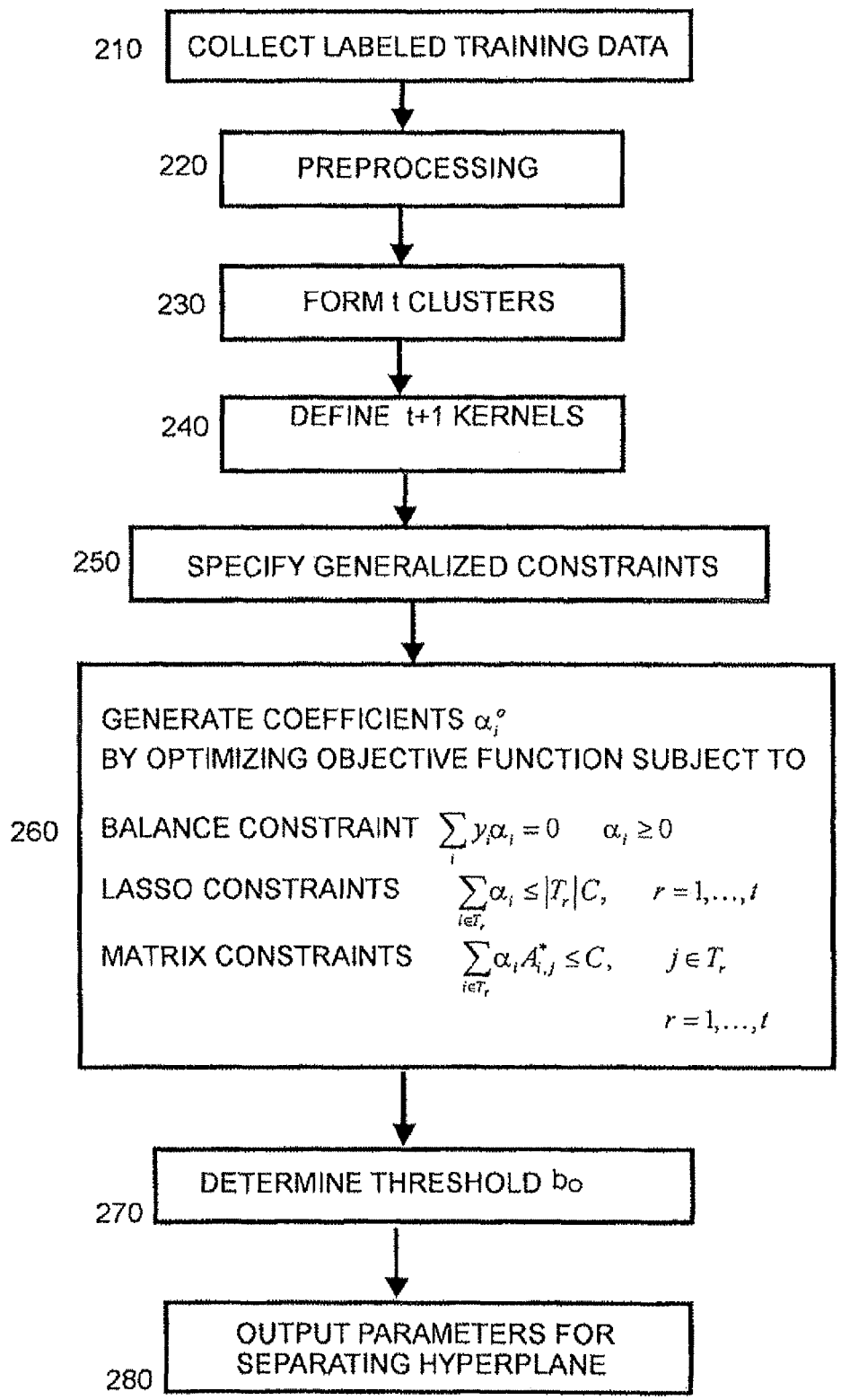
FIG. 2 is a flowchart of processing performed in training a learning machine/classifier in accordance with the preferred embodiment.

FIG. 2 is a flowchart of processing performed in training a learning machine/classifier in accordance with the preferred embodiment. At step 210, the raw labeled training data $\{(x_i^o, y_i)\}_{i=1}^{l}$ is collected. This data may come in any arbitrary format and may come from multiple sources, e.g. known data fusion techniques could be used to integrate information from disparate data sources into a form which could be used as the labeled training data. At step 220, general preprocessing can be performed on the raw labeled training data to obtain the input training data $\{(x_i, y_i)\}_{i=1}^{l}$. The present invention is not limited to any specific preprocessing technique. Examples of conventional techniques of preprocessing include centralization, normalization, scaling, clipping, etc. Data with gaps or with different time scales, for example and without limitation, can be readily reconciled using well-known preprocessing techniques. As a more sophisticated example, data which is subject to invariances under some form of symmetry transformation can also be transformed by preprocessing into a form that renders the classifier also invariant to the transformations.

At step 230, the input training data $\{(x_i, y_i)\}_{i=1}^{l}$ is clustered to form $t \geq 1$ clusters. As mentioned above, the t clusters can be formed manually or using any of a number of known automated clustering techniques. The present invention is not limited to any specific clustering technique. Any clustering technique, including a hierarchical approach or a partitioning approach such as a k-means or k-medians clustering algorithm, can be readily adapted and utilized. Where the input training data is represented in vector form $x_1, \ldots, x_l$, these vectors would be the disjoint union of the t clusters of vectors $x_i$. Define the set of the indices of the input training vectors from cluster r, $$X_r = \{x_{i1}, \ldots, x_{i_{n_r}}\}, \text{ by } T_r = \{i_1, \ldots, i_{n_r}\}.$$

It should be noted that although, for purposes of the following discussion, the clusters are assumed to depend on the values of the $x_i$, the clusters could readily be arranged so as to also depend on the values of the $y_i$.

At step 240, kernel functions are defined for the learning machine. As discussed above, the input training vectors $x_i \in X_r$ are simultaneously mapped into a separating space $z_i \in Z$ and a correction space $z_i^r \in Z_r$. Input vectors of different clusters are mapped to the same separating space Z but to different correction spaces Z. The separating space Z defines the separating function. The correction space $Z_r$ defines a correction function $$\xi_i = \phi_r(x_i, a), a \in A_r, x_i \in X_r, r=1, \ldots, t \quad (2)$$

for each cluster $X_r$ from a set of admissible correcting functions, $\phi_r(x_i, a)$, $a \in A_r$, for this cluster. It is assumed that the admissible set of correction functions $\xi = \phi(x, a)$, $a \in A_r$, can be described as linear non-negative functions in $Z_r$ space:

$$\xi_i = \phi_r(x_i, a_r) = (w_r, z_i^r) + d_r \geq 0, r=1, \ldots, t.$$

Again, as noted above, the correction functions could also depend on the $y_i$ values, although this is not explicitly indicated here. The separating space Z and the correction spaces $Z_r$ are preferably represented as Hilbert spaces. In accordance with Mercer's theorem, there exists in the input vector space a positive definite function, referred to in the art as a kernel function, that defines a corresponding inner product in the separating space Z and the correction spaces Zr. Accordingly, the corresponding inner product for the separating space can be defined by the kernel $$(z_i, z_j) = K(x_i, x_j)$$

while the corresponding inner product in the correction space for cluster r can be defined by the kernels $$(z_i^r, z_j^r) = K_r(x_i, x_j) \geq 0, i, j \in T_r, r=1 \ldots t.$$

Note that although prior art techniques use a single kernel, the herein disclosed technique uses up to (t+1) distinct kernels.

The present invention is not limited to any specific form of kernel function for either the separating space or the correction space(s). The most popular kernels used in machine learning today are the polynomial kernel of degree d $$K(x_i, x_j) = ((x_i, x_j) + C)^d$$

and the exponential kernel $$K(x_i, x_j) = \exp\left\{-\left(\frac{\|x_i - x_j\|}{\sigma}\right)^d\right\}, \sigma > 0, 0 \leq d \leq 2.$$

An optimal separating function can then be constructed. The optimal separating hyperplane in the separating space can be found by minimizing the objective function $$R(w, w_1, \ldots, w_t) = \frac{1}{2}(w, w) + C \sum_{r=1}^{t} \sum_{i \in T_r} ((w_r, z_i^r) + d_r),$$

subject to the constraints $$y_i[(w, z_i) + b] \geq 1 - ((w_r, z_i^r) + d_r), i \in T_r, r=1, \ldots, t,$$

and $$(w_r, z_i^r) + d_r \geq 0, i \in T_r, r=1, \ldots, t.$$

The corresponding Lagrangian is $$L(w, w_1, \ldots, w_t; \alpha, \mu) = \frac{1}{2}(w, w) + \sum_{r=1}^{t} \sum_{i \in T_r} ((w_r, z_i^r) + d_r) -$$

$$\sum_{i=1}^{l} \alpha_i [y_i((w, z_i) + b) - 1 + (w_r, z_i^r) + d_r] - \sum_{i=1}^{l} \mu_i ((w_r, z_i^r) + d_r).$$

It can then be shown that the optimal separating hypersurface in X (input) space has the form $$\sum_{i=1}^{l} \alpha_i^o y_i K(x_i, x) + b_o = 0 \quad (3)$$

where the coefficients $\alpha_i$ maximize the quadratic form $$W(\alpha) = \sum_{i=1}^{l} \alpha_i - \frac{1}{2} \sum_{i,j=1}^{l} y_i y_j \alpha_i \alpha_j K(x_i, x_j) \quad (4)$$

subject to the constraints $$\sum_{i=1}^{l} y_i \alpha_i = 0 \quad (5)$$

and $$\sum_{i \in T_r} \alpha_i \leq |T_r| C, r=1, \ldots, t \quad (6)$$

and $$\sum_{i \in T_r} \alpha_i K_r(x_i, x_j) \leq C \sum_{i \in T_r} K_r(x_i, x_j), j \in T_r, r=1, \ldots, t. \quad (7)$$

where $|T_r|$ is the number of elements in cluster $T_r$ and where $\alpha_i \geq 0$ for $i=1, \ldots, l$. The inventors refer to the constraint in equation (5), which is the same as disclosed in the prior art, as a "balance" constraint. The t constraints in equation (6) will be recognized by those skilled in the art as what is referred to as a "lasso" constraint (see R. Tibshirani, "Regression Shrinkage and Selection via the Lasso," J. R. Statist. Soc. (B), 58, 267-288 (1996)).

The constraint in equation (7) can be rewritten in the form $$\sum_{i \in T_r} \alpha_i A_{i,j}^* \leq C, j \in T_r, r=1, \ldots, t \quad (8)$$

where the $0 \leq A_{i,j}^* \leq 1$ are elements of a symmetric matrix $A^*$ that satisfies the equalities $$\sum_{i=1}^{l} A_{i,j}^* = 1, j=1, \ldots, l.$$

The inventors refer to the constraints defined in equation (8) as the matrix constraints. Note that the above constraint matrix form can be considered as a generalized form of the prior art constraint of $0 \leq \alpha_i \leq C$. When $A_{i,j}^* = 1$ if $i=j$ and $A_{i,j}^* = 0$ if $i \neq j$, i.e., if the matrix $A^*$ is an l×l identity matrix, then the above generalized constraint defines the box constraints that are independent of the data, just as in the prior art. In this case, the lasso constraints in equation (6) are automatically satisfied. The disclosed technique, however, has the advantage of enabling a broader specification of constraints which can be dependent on the global structure of the data. The learning machine, accordingly, can consider the global structure of the training data—which prior art support vector machine techniques ignore.

With reference again to FIG. 2, the generalized constraints are specified at step 250. This can be accomplished by defining the constraint matrix $A^*_{i,j}$ as described above. Then at step 260, the coefficients $\{\alpha_i^o\}_{i=1}^l$ specifying the separating hyperplane are generated by optimizing the objective function in equation (4) under constraints (5), (6), and (8). This has the effect of allowing each cluster $T_r$ to have its own correction function $(w_r z_i)+d_r$. Finally, at step 270, using the training data $\{(x_i, y_i)\}_{i=1}^l$ and the multipliers $\{\alpha_i^o\}_{i=1}^l$, the threshold $b_0$ can be readily determined. The training parameters for the learning machine are $\Omega=\{\alpha_1^o, \ldots, \alpha_1^o, b_o\}$. These parameters determine the separating hyperplane in Z (feature) space.

Figure 3:
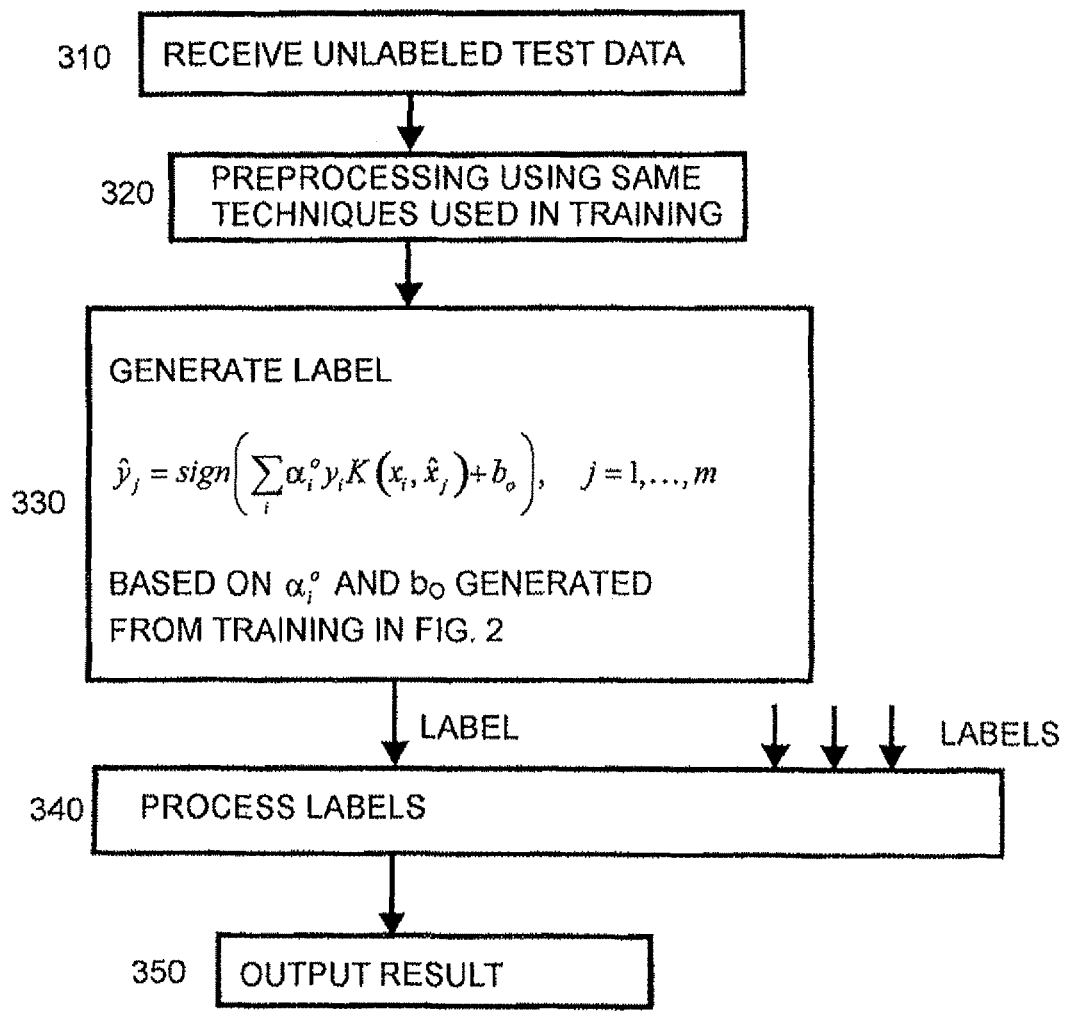
FIG. 3 is a flowchart of processing performed in operating the learning machine/classifier in accordance with the preferred embodiment.

FIG. 3 is a flowchart of processing performed by the learning machine, after the learning machine classifier has been trained. The learning machine classifier can be arranged as a single binary classifier or can be arranged as a multiclass classifier using known techniques for reducing a multiclass classification problem to several binary classification problems. At step 310, the raw unlabeled data $\{\hat{x}_i^o\}_{i=1}^m$ is collected. Again, as discussed above, the raw data may be represented in an arbitrary manner and may in fact be fused from multiple sources. At step 320, general preprocessing is performed on the data, as in the training phase, to obtain $\{\hat{x}_i\}_{i=1}^m$. At step 330, the coefficients $\{\alpha_i^o\}_{i=1}^l$ and the threshold $b_o$ generated above are used to define the separating hyperplane. In the Z (feature) separating space, the learning machine determines which side of the hyperplane each testing point lies on, by computing $$\hat{y}_j = \text{sign}\left(\sum_{i=1}^l \alpha_i^o y_i K(x_i, \hat{x}_j) + b_o\right), j = 1, \ldots, m.$$

These values are the computed labels for the given data. Where the classifier is a binary classifier, the generated label can be simply output or used in the relevant application. Where the classifier is a multiclass classifier, the generated labels from a plurality of binary classifiers are combined at step 340 using known techniques. For example, and without limitation, the multiclass classifier can be comprised of a plurality of binary classifiers, trained as above, where each binary classifier could compare one class to all others or could compare classes pairwise. The final result can then be output at step 350.

The machine learning methods disclosed herein may be readily adapted and utilized in a wide array of applications to construct a separating or decision function which describes (e.g., classifies, predicts, etc.) data in multidimensional space, the data corresponding to a phenomenon of interest, e.g., images, text, stock prices, etc. More specifically, the applications include, for example and without limitation, general pattern recognition (including image recognition, object detection, and speech and handwriting recognition), regression analysis and predictive modeling (including quality control systems and recommendation systems), data classification (including text and image classification and categorization), bioinformatics (including automated diagnosis systems, biological modeling, and bioimaging classification), data mining (including financial forecasting, database marketing), etc.

One skilled in the art will recognize that any suitable computer system may be used to execute the machine learning methods disclosed herein. The computer system may include, without limitation, a mainframe computer system, a worksta-tion, a personal computer system, a personal digital assistant (PDA), or other device or apparatus having at least one processor that executes instructions from a memory medium.

The computer system may further include a display device or monitor for displaying operations associated with the learning machine and one or more memory mediums on which one or more computer programs or software components may be stored. For example, one or more software programs which are executable to perform the machine learning methods described herein may be stored in the memory medium. The one or more memory mediums may include, without limitation, CD-ROMs, floppy disks, tape devices, random access memories such as but not limited to DRAM, SRAM, EDO RAM, and Rambus RAM, non-volatile memories such as, but not limited hard drives and optical storage devices, and combinations thereof. In addition, the memory medium may be entirely or partially located in one or more associated computers or computer systems which connect to the computer system over a network, such as the Internet.

The machine learning methods described herein may also be executed in hardware, a combination of software and hardware, or in other suitable executable implementations. The learning machine methods implemented in software may be executed by the processor of the computer system or the processor or processors of the one or more associated computers or computer systems connected to the computer system.

Figure 4:
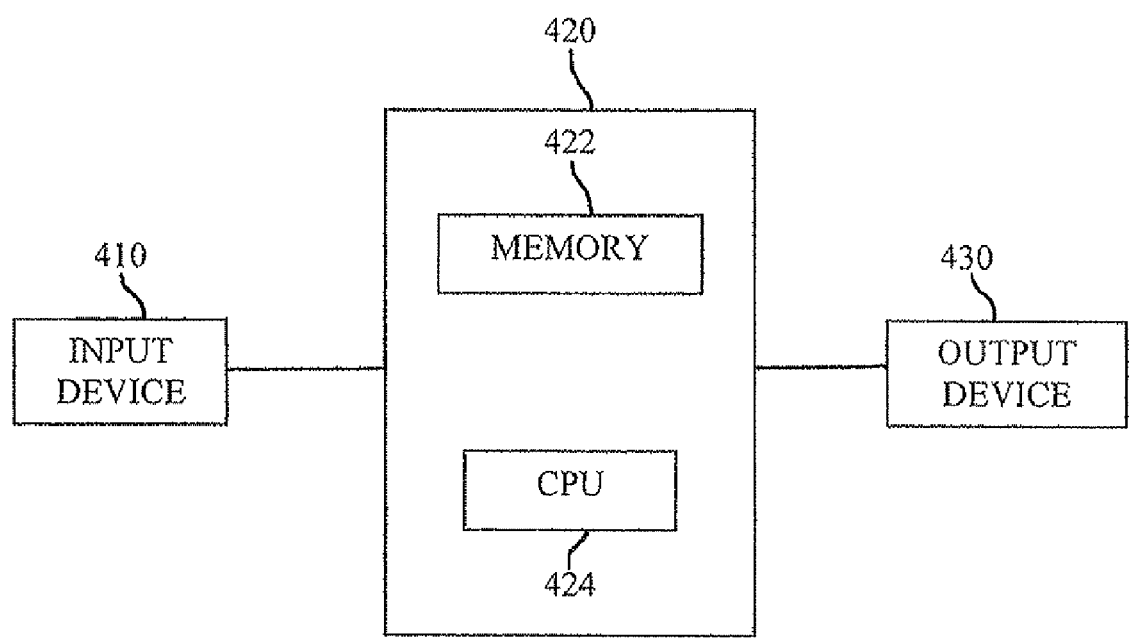
FIG. 4 is a block diagram of an exemplary embodiment of a computer system for performing the machine learning technique disclosed herein.

FIG. 4 is a block diagram of an exemplary embodiment of a computer system 400 for performing the machine learning methods described herein. The computer system 400 includes an input device 410, one or more processors 420 (only one shown), and an output device 430. The input device 410 may comprise any device capable of inputting data about the phenomenon of interest including, without limitation, a tablet computer for generating handwritten digits, a digital camera, an ECO recorder, to name a few. The input device 410 inputs the labeled training data about the phenomenon of interest, into the processor 420. In one non-limiting embodiment, the labeled training data may comprise a plurality of patterns which train the SVM+ learning machine for use in pattern classification. In another non-limiting embodiment, the labeled training data may comprise monetary data which trains the SVM+ learning machine for use in financial forecasting. The labeled training data inputted into the processor 420 may be collected and preprocessed in accordance with the preferred embodiment described earlier. The processor 420 includes a memory 422 that stores programmed instructions for executing the SVM+ learning machine described earlier. The processor 420 further includes a Central Processing Unit (CPU) 424 for executing the leaning machine program instructions disclosed herein, in order to construct a separating function, using the labeled training data, thereby making the computer system 400 operative for use in describing unlabeled data about the phenomenon of interest in pattern recognition, regression analysis and predictive modeling, data classification, bioinformatics, data mining, and other useful applications.

After the computer implemented SVM+ learning machine has been trained, the input device 410 of the computer system 400 inputs unlabeled data about the phenomenon of interest into the processor 420 in accordance with the methods disclosed herein. In the earlier mentioned embodiment wherein the SVM+ learning machine has been trained for use in pattern classification, the unlabeled input data may comprise a plurality of patterns to be classified by the computer system 400 using the trained SVM+ learning machine. In any case, the unlabeled data inputted into the processor 420 may also be collected and preprocessed in accordance with the preferred embodiment described earlier. The CPU 424 of the processor then executes the SVM+ leaning machine program instructions disclosed herein using the coefficients $\{\alpha_i^o\}_{i=1}^l$ and the threshold $b_o$ generated above during training of the SVM+ learning machine, to describe the phenomenon of interest, or in other words, classify, analyze, mine or otherwise transform the unlabeled input data corresponding to the phenomenon of interest into a form that is useful for analysis, control and decision making. The processor 420 then outputs the result of the SVM+ learning machine (e.g., classified patterns) to the output device 430. In embodiments where the output device 430 comprises the display monitor, the display monitor may display the transformed data in a suitable manner so that a user can make some decision or take some action (e.g., identify an image, recognize a handwriting sample, buy or sell a stock, and control a manufacturing process, to name a few). Alternatively, the output device 430 may comprise a device that further processes the transformed data and automatically makes a decision or takes some action as a result of or in response to this data.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed:

1. A method for training a support vector machine, the method comprising:

receiving input vectors from a labeled dataset that have been clustered into one or more clusters, the input vectors from the labeled dataset relating to a phenomenon of interest;

creating simultaneously a t+1 space of a decision function and a t space of a correcting function where t is the number of clusters;

specifying generalized constraints in said space of said correcting function which are dependent upon the clusters of input vectors in the dataset;

generating in said space of said correcting function, a subset of the input vectors from the dataset using said decision function subject to the generalized constraints, said subset of the input vectors defining a separating hyperplane in a space of said decision function, said subset of the input vectors for use by said support vector machine in describing input vectors from an unlabeled dataset relating to said phenomenon of interest; and wherein the generalized constraints can be represented as $$\sum_{i \in T_r} \alpha_i K_r(x_i, x_j) \le C \sum_{i \in T_r} K_r(x_i, x_j), j \in T_r, r = 1, \ldots, t$$

$$\sum_{i \in T_r} \alpha_i \le |T_r|C, r = 1, \ldots, t,$$

$$\sum_{i=1}^{l} y_i \alpha_i = 0, \alpha_i \ge 0$$

where there are t clusters and where $K_r$ is the kernel function defined on the correct space into which the input vectors within the cluster r are mapped, $\alpha_i$ are the coefficients determining the separating hyperplane in the separating space, and $T_r$ defines a set of indices of input vectors within a cluster r.

2. The method of claim 1 wherein the generalized constraints are dependent upon two different kernel functions, one for said space of said decision function and the other for said space of said correcting function into which the input vectors with a cluster are mapped.

3. The method of claim 2 wherein the input vectors of different clusters are mapped to the same separating space but to different spaces of said correcting function.

4. The method of claim 2 wherein said space of said correcting function defines a correction function for each cluster.

5. The method of claim 1 wherein generalized constraints are alternatively represented as $$\sum_{i \in T_r} \alpha_i A_{i,j}^* \le C, j \in T_r, r = 1, \ldots, t.$$

6. The method of claim 5 wherein the matrix $A^*_{i,j}$ is an identity matrix and defines box constraints.

7. The method of claim 5 wherein the matrix $A^*_{i,j}$ does not define box constraints.

8. The method of claim 1 wherein preprocessing is applied to the dataset in order to obtain the input vectors.

9. The method of claim 1 wherein multiple sets of coefficients are generated so as to form a multiclass classifier.

* * * * *